Jan. 5, 1960
G. W. MEEK
2,919,861
SPRAYING DEVICE FOR A COOLING TOWER AND THE LIKE
Filed Oct. 23, 1956
2 Sheets-Sheet 1
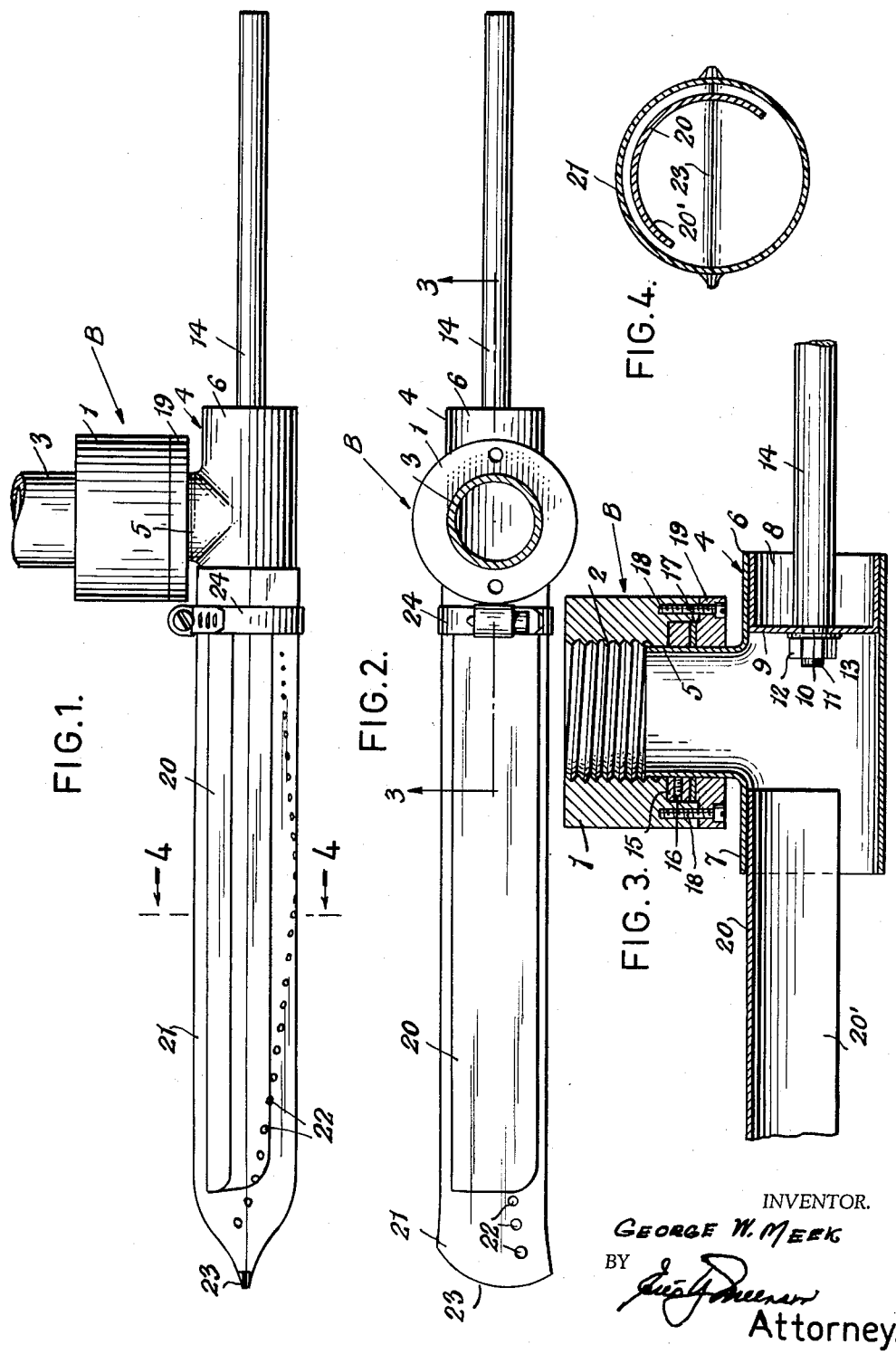
INVENTOR.
GEORGE W. MEEK
BY
Attorney.

Jan. 5, 1960    G. W. MEEK    2,919,861
SPRAYING DEVICE FOR A COOLING TOWER AND THE LIKE
Filed Oct. 23, 1956    2 Sheets-Sheet 2
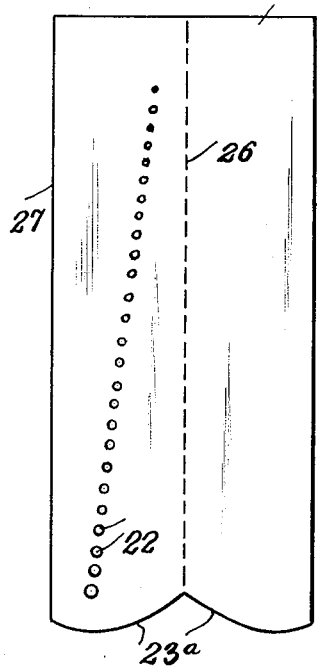
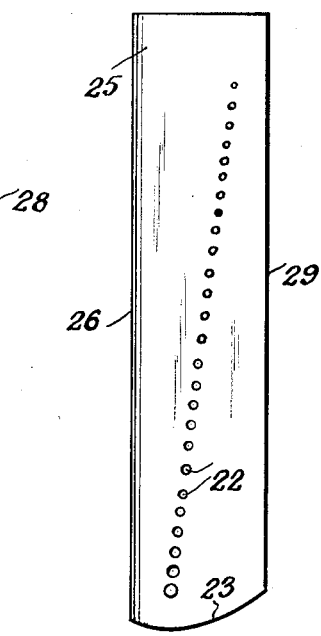
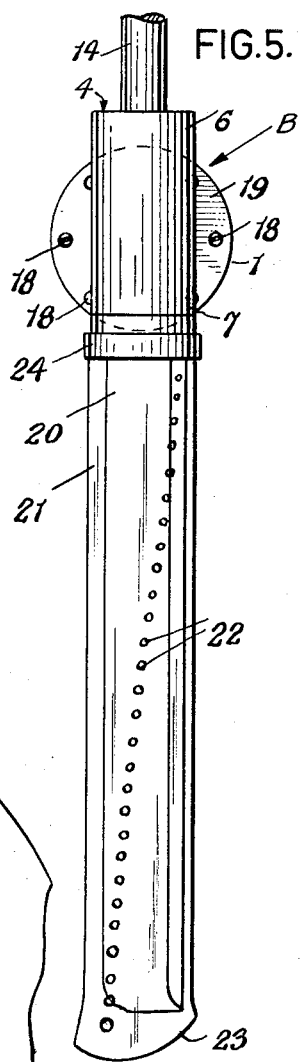
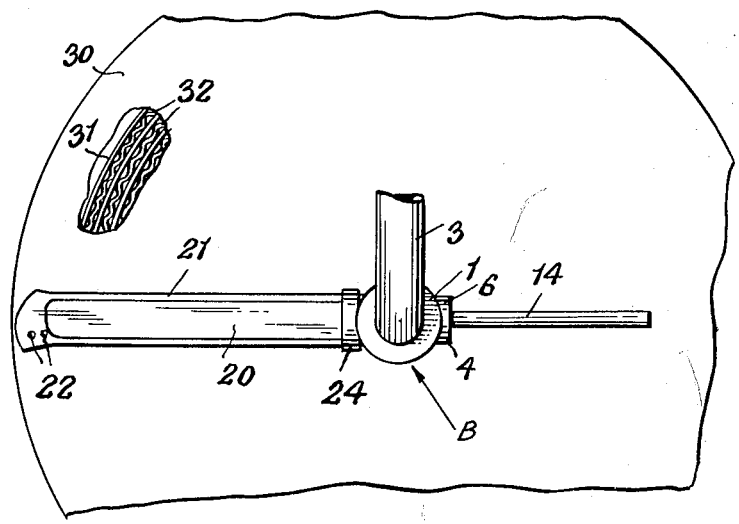
INVENTOR.
GEORGE W. MEEK
BY
Attorney

United States Patent Office

2,919,861
Patented Jan. 5, 1960

2,919,861
SPRAYING DEVICE FOR A COOLING TOWER AND THE LIKE

George W. Meek, Pelham, N.Y., assignor to Lizenzia A.G., Zug, Switzerland, a corporation of Switzerland Application October 23, 1956, Serial No. 617,838

5 Claims. (Cl. 239—261)

This invention relates to liquid distributing systems for gas and liquid contact apparatus, and particularly to a spraying apparatus for employment in a cooling tower for the purpose of cooling water by evaporative methods.

In the type of cooling tower in which the spraying device of the present invention is used, the spraying device, located above a packing or so-called fill, sprays water or other suitable liquid on the fill, and the water or other liquid thus sprayed, flows by gravity through the packing where it comes in contact with air or other gaseous media which flows through the packing by natural draft or by an induced or forced draft.

The present invention has reference to a spraying device operatvie as above described, and which in the form disclosed, includes a spraying tube or sleeve provided with a line or row of graduated-size spray openings, and which sleeve is composed of a relatively thin, flexible plastic material of such nature as to permit of ready flexure of the sleeve not only under water pulsations, but when required, under manual pressure. Under certain water conditions, and particularly when so-called "hard" water is used, there is tendency for scale and foreign material to accumulate on a spraying tube, with the results that the spray openings therein sometimes become clogged or partly clogged to thus materially impair the operation of the apparatus. In such cases it becomes necessary to shut off the apparatus and dismantle the sprayer to clean out the clogged spray openings, and the present invention seeks to eliminate the necessity for doing so. It is another object of the invention to provide in a spraying device of this character, a hollow bearing through which a flow of water takes place, a bearing which will be leakproof and which will be water lubricated.

It is therefore an object of the present invention to provide a spraying tube which will be self-cleaning in that its construction is such as to materially retard the accumulation of scale or foreign matter, and which can, should cleaning become actually necessary, be readily performed by merely flexing or collapsing the body of the tube.

It is another object of the invention to provide an improved method of producing such a tube and by which the same can be quickly and economically made from readily-available material.

With these objects, and such other objects as may hereinafter appear in view, I have devised the arrangement of parts to be described and more particularly pointed out in the claims appended hereto.

In the accompanying drawings, wherein an illustrative embodiment of the invention is disclosed, Fig. 1 is a side elevational view of a sprayer constructed in accordance with the invention;

Fig. 2 is a top plan view of the same;

Fig. 3 is an enlarged fragmentary vertical sectional view taken on line 3—3 of Fig. 1 with the sprayer tube removed;

Fig. 4 is an enlarged sectional view taken substantially on the line 4—4 of Fig. 1, looking in the direction of the arrows;

Fig. 5 is a view looking at the underside of the sprayer;

Fig. 6 is a face view of the blank or sheet from which the spray tube or sleeve is formed;

Fig. 7 shows the blank in its folded form preparatory to being sealed into tubular shape; and Fig. 8 is a top plan view of the sprayer showing a portion of the packing that is sprayed thereby.

In Fig. 8 of the drawing is disclosed at 30 a portion of the fill or packing that is sprayed by the improved spraying device. In the preferred embodiment, the packing is composed of alternate corrugated and flat sheets or foils 32 and 31 respectively, which may be wound in overlapping or spirally-arranged layers. The pipe-like channels or passages formed by the layers extend in an axial direction throughout the packing. The individual sheets or foils 31 and 32 are spaced so closely in respect to one another that the liquid would tend to bridge between them and thus would plug or block the cells unless some means is provided for breaking the surface tension and this is done for example as shown in a pending patent application, Serial No. 442,688, filed June 21, 1956 now U.S. Patent No. 2,809,817.

Located above the packing is a conduit 3 extending from a water source for delivering water into hollow bearing B including a head 1 to which the conduit is coupled by means of the threads 2. The head is preferably composed of a non-metallic material such as "Teflon." Indicated generally at 4 is a coupling or hub of inverted shape, being thus provided with the upwardly-extending or vertical tubular portion 5, projecting into the head 1 and rotative therein. Fixed around the outside of the portion 5 is a collar 15, secured thereto by one or more set screws 16. A washer 17 of suitable anti-friction material is interposed between the under side of the collar 15 and the upper face of a disk 19 secured to the bottom of the head 1 by the screws 18. This arrangement is such that the head 1, being connected to conduit 3, is maintained stationary and forms a bearing for the coupling or hub 4 which can rotate freely within it. The head 1, collar 15 and washer 17 being of non-corrosive material, with the washer 17 of non-metallic material, result in a water-lubricated, leakproof joint.

The coupling or hub 4 also includes the tubular arm portions 6 and 7 which extend radially from the part 5. The arm portion shown at 6 is interiorly fitted with a cup-shaped closure 8 provided with the wall 9 having a central opening 10 through which the threaded end 11 of a rod 14 extends. The rod 14 is rigidly attached to the wall 9 and closes the opening 10 therein by means of the nut 12 and the washer 13. This rod 14 constitutes a counter-balance for the spray arm connected to the tubular arm 7, and now to be described.

Secured in the tubular arm portion 7 of the coupling 4, is a channel-shaped arm 20, constituting an elongated, rigid radial extension of the coupling or hub 4. Said arm 20 has its under or concave surface 20' facing downwardly. The spray tube is shown at 21, and the same preferably consists of a bag-like sleeve of flexible, relatively thin sheet material such as flexible water-impervious plastic like polyethylene or other material or like characteristics. The material of which the sleeve 21 is composed is such that the sleeve is capable of flexure under the pulsations of the water forced into the sleeve, and by such flexure tends to greatly retard the formation of scale or the collection of foreign matter on the sleeve. The sleeve can also be collapsed or flattened under manual pressure whenever necessary and by such flattening or collapsing movement, it will dislodge any scale or foreign matter that may have collected upon it, thus facilitating the easy cleansing of the sleeve. The sheet material of which the sleeve is composed is of such nature that it is only slightly expansible in the surface extension of the sheet.

The sleeve 21 is provided with a sealed or closed free end 23, and said sleeve is of a diameter that its opposite open end slips in place over the end of the tubular arm 7 and secured in position thereon by means of a hose clamp 24 or other suitable fastening means. The sleeve is provided with orifices 22 which are arranged in spaced relation along a substantially helical line so as to project the water substantially horizontally at the outer end of the sleeve and progressively downwardly from the horizontal as the orifices approach the hub or coupling 4. This construction results in all parts of the packing 30, from its center to its periphery, being sprayed by at least some of the water emanating from the orifices 22. The orifices 22 are preferably of circular cross section and their diameter increases in proportion to the distance from the hub or coupling 4, as will be seen in Figs. 5, 6 and 7. The reason for the progressive increase in diameter of the orifices as they approach the periphery, is that when the orifices are uniformly distributed along the sprayer arm, the circular area of the packing surface to be sprayed is increased with the increase of distance from the center of the packing. By reason of the large diameter of the orifices, they will resist being clogged by scale or other foreign matter carried by the water and because of the flexible nature of the material from which the sleeve is formed, the possibility of the clogging of the orifices becomes remote.

The sleeve 21 may be composed of a length of formed plastic tubing sealed at one end, or it can be economically produced from a flat blank or sheet as shown in Figs. 6 and 7. That is to say, a blank is formed from the required plastic sheet material and of the shape shown in Fig. 6. The blank thus formed is stamped to produce the orifices 22 as shown. The blank is then folded on the central, longitudinal fold line 26 to bring the two longitudinal edges 27 and 28 together and these two edges are thereupon united by heat-sealing methods. By the folding of the blank on the line 26, the ends shown at 23a are also brought into contact and these two ends are joined by heat-sealing to form the closed end 23 on the sleeve, which is then ready for use. In this exemplary embodiment the tube 21 is constructed from a transparent plastic.

In the operation of the device, the water flows continuously through the conduit 3 into the head 1 and therethrough into the coupling or hub 4 and out through the sleeve 21, to be ejected from the orifices 22. These orifices are located below the concave side of the supporting arm 20 and the circular path traversed by the sleeve 21 above the packing 30 is thus sprayed by water from the sprayer in the form of a continuous stream. Due to the flexibility of the sleeve 21, it is capable of flexure with a collapsing and expanding movement under pulsations of the water and any scale or foreign matter normally tending to collect on the sleeve and possibly clog the orifices therein, will be dislodged and fall away. Also, since the sleeve is capable of collapse under finger pressure, it may from time to time be manually squeezed in the hand to dislodge any collected scale upon it. Due to the nonexpansible nature of the sheet material of which the sleeve is composed, the sizes of the orifices in the sleeve are substantially unaffected by variations in water pressure, so that uniform distribution of the water over the packing in the cooling tower is insured.

Having described an embodiment of the invention, it is obvious that the same is not to be restricted thereto, but is broad enough to cover all structures coming within the scope of the annexed claims.

What I claim is:

1. A spraying device of the character described having a rotatable arm, a tubular water-supply coupling for receiving pressurized water therethrough, said coupling being attached at one end of said arm whereby water emerging from the coupling is directed toward said arm, and a soft flexible, collapsible bag-like sleeve of water-impervious material attached to the coupling and enclosing the arm for the length of the arm and having a row of spray holes of gradually increasing diameter extending along a major portion of said arm, the outer end of said sleeve being closed and the sleeve being capable of flexure to retard the collection of scale, the arm being channel shaped with its concave side facing downwardly, and the row of spray holes in the sleeve being located below the concave side of the arm.

2. A spraying device comprising a hollow bearing for connection to a conduit, an inverted T-shaped coupling rotatively mounted in the bearing, said coupling having one tubular arm provided with an extended channel-shaped member, said coupling having a second arm connected to counter-balancing means thereon, a flexible collapsible, bag-like sleeve of plastic material fitted over and enclosing the channel-shaped member and attached at one end to the first arm of the coupling so that water flowing therethrough will flow into the sleeve, the sleeve being provided with a plurality of spray holes through which said water is ejected downwardly, the material of which the sleeve is composed being of such flexibility as to permit flexure of the sleeve under water pulsations as well as to permit of manual deformation of the sleeve under manual pressure to retard the collection of scale on the sleeve as well as to dislodge any scale that might possibly collect thereon.

3. A spraying device of the character described comprising, a hollow stationary bearing, a water conduit leading thereto, a tubular coupling member rotatively mounted in the bearing, a rigid arm extending from the bearing, a tubular, collapsible and normally collapsed sleeve communicating with said hollow bearing and extending longitudinally of the arm and supported in a collapsed condition thereby and extending around and enclosing the arm, said sleeve being composed of a flexible material permitting of its collapse when not under water pressure from within it, and which is distendable to tubular shape when under such water pressure during the spraying operation, whereby the collapse and distension of the sleeve tends to retard the collection of scale on it.

4. A spraying device of the character described including a hollow bearing having a rotatable arm, a closed sleeve communicating at one end with said hollow bearing and fitted around and enclosing the arm and extending longitudinally thereof, said sleeve having a plurality of spray openings arranged in a line along the arm, said sleeve being composed of a relatively soft but flexible plastic material for permitting the sleeve to collapse when not under water pressure from inside of it, and being distendable into tubular formation when such water pressure is present within it, said arm supporting said sleeve in its collapsed condition whereby the collection of scale on it can be retarded or dislodged by its alternate collapsing and distending movements.

5. In a spraying device as provided for in claim 4, wherein the spray openings progressively vary in size along the major portion of the length of the sleeve, and the material of which the sleeve is composed prevents material enlargement of the spray openings under the water pressure.

References Cited in the file of this patent

UNITED STATES PATENTS

| | | |
|---|---|---|
| 935,071 | Vossler | Sept. 28, 1909 |
| 2,582,158 | Porter | Jan. 8, 1952 |
| 2,608,438 | McDonald | Aug. 26, 1952 |
| 2,633,384 | Cockrell | Mar. 31, 1953 |
| 2,749,180 | Andrews | June 5, 1956 |

FOREIGN PATENTS

| | | |
|---|---|---|
| 90,748 | Germany | Feb. 12, 1897 |